Oct. 22, 1940.   S. G. DOWN   2,218,605
ELECTRICALLY CONTROLLED BRAKE
Filed Aug. 31, 1939
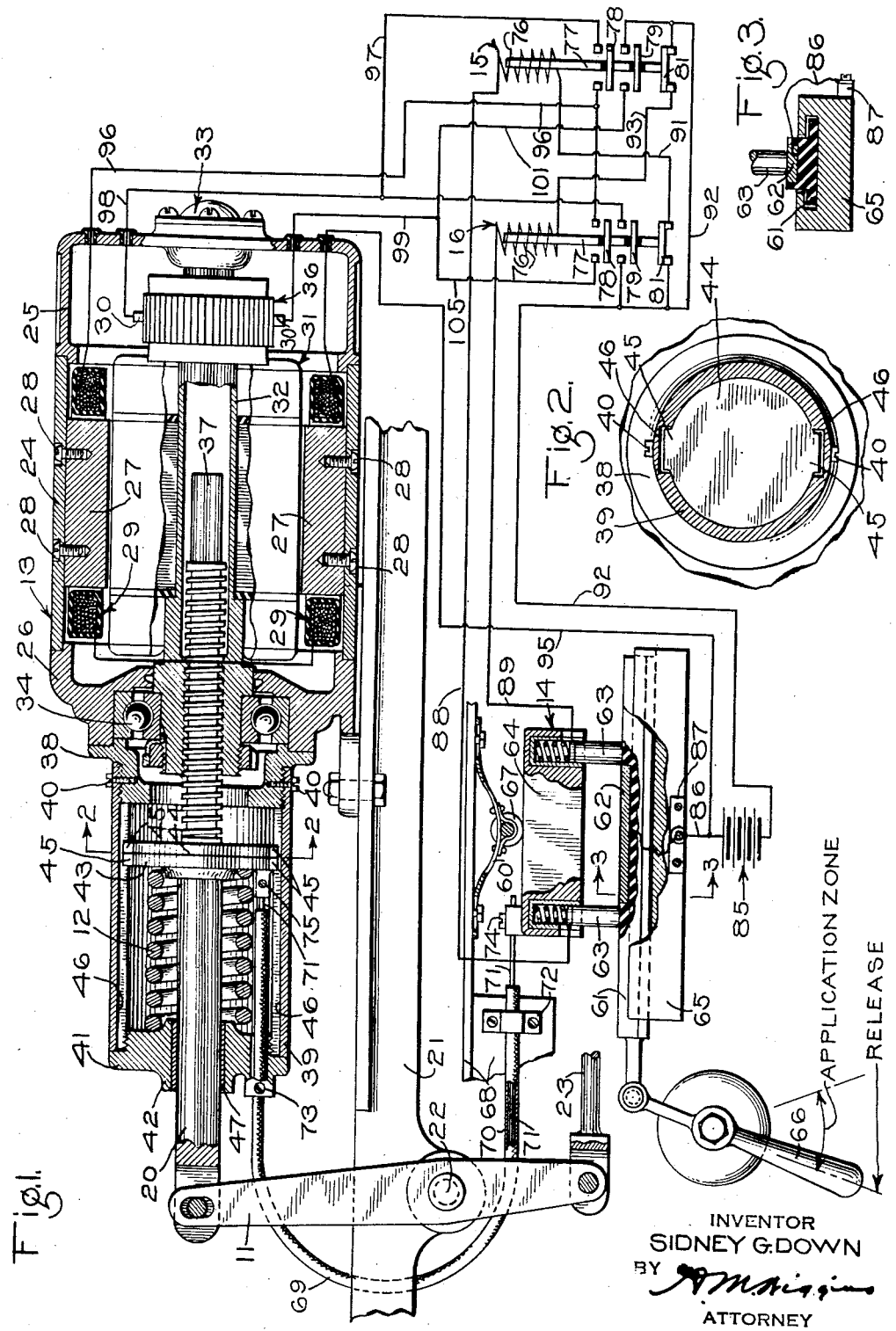
INVENTOR
SIDNEY G. DOWN
BY H. M. Higgins
ATTORNEY Patented Oct. 22, 1940

2,218,605

UNITED STATES PATENT OFFICE 2,218,605

ELECTRICALLY CONTROLLED BRAKE

Sidney G. Down, Edgewood, Pa., assignor to The Westinghouse Air Brake Company, Wilmerding, Pa., a corporation of Pennsylvania Application August 31, 1939, Serial No. 292,817

2 Claims. (Cl. 188—173)

This invention relates to electrically controlled brakes adaptable for use with various types of braked members, such as the wheels of railway cars and trains.

The most common types of electrically controlled brakes are those employed, for example, in crane and elevator installations and are of such nature that the brakes are applied by the force of a spring usually of the coil or spiral type, and released by means of a solenoid acting in opposition to the spring.

The solenoid type of brake is best suited to those applications where the brake is either fully applied or fully released without any graduation of the degree of application. In the case of railway car brakes, however, it is necessary to provide for graduation of the application, that is, variation of the degree of brake application over a relatively wide range. The solenoid type of brake does not lend itself readily, therefore, to use in railway car brake application.

It is accordingly an object of my invention to provide an electrically controlled brake which is not of the solenoid type, and which is of such nature that the degree of application may be controlled and varied to a selected degree.

Another object of my invention is to provide vehicle wheel brake apparatus of the type in which the brakes are applied by the force of a spring and further characterized by an electric motor adapted to be so controlled as to vary the degree of force exerted by the spring in applying the brakes.

The above objects, and other objects of my invention will be made apparent hereinafter, are attained by means of apparatus subsequently to be described and shown in the accompanying drawing, wherein Fig. 1 is a simplified diagrammatic view of one embodiment of my invention, certain of the parts being shown in section and certain others being broken away for clarity, Fig. 2 is a sectional view taken on the line 2—2 of the Fig. 1, and Fig. 3 is a sectional view, taken on the line 3—3 of Fig. 1.

Description of equipment

Referring to Fig. 1, the apparatus shown comprises a brake operating lever 11, a coil spring 12 adapted to exert a force on the brake lever 11 to effect application of the brake, an electric motor 13 of the direct-current series type having a high starting torque and control apparatus for the motor 13 including a manually operative automatically self-lapping switch device 14, and two directional relays that are controlled by the switch device 14, the two relays being hereinafter designated as the application relay 15 and the release relay 16, respectively.

Considering the parts of the equipment in greater detail, the brake lever 11 is pivotally mounted on a fixed member 21, which may be a part of the vehicle frame or of the vehicle truck frame, as by a pin 22. Pivotally connected to the lower end of the brake lever 11 is a brake operating rod 23 which may be a part of conventional brake rigging and which is adapted to effect movement of the brake shoes (not shown) into and out of braking engagement with a member to be braked, such as a vehicle wheel not shown. Pivotally connected to the upper end of the brake lever 11 is another brake operating rod 20 which is suitably arranged in a manner hereinafter described to transmit the force of spring 12 to effect pivotal movement of the brake lever 11 in a direction to effect application of the brakes and opposite pivotal movement of the brake lever 11 to effect release of the brakes.

The motor 13 has a suitable casing or supporting frame of sectionalized character including a central cylindrical section 24 and two end sections or covers 25 and 26, respectively, which are secured to opposite ends of the central section 24 by screws or bolts not shown.

For simplicity, the motor 13 is shown as of the bipolar type having a pair of pole pieces 27 secured in a diametrically opposed relation within the central casing section 24 as by a plurality of screws 28. Suitably secured to the wall of the central casing section 24 in conventional manner in concentric surrounding relation to each of the pole pieces 27 is a field coil or winding 29, the two coils being connected in series relation by a connecting conductor or strap in the manner indicated.

The rotary armature 31 of the motor has a hollow or tubular shaft 32 which is suitably journaled at one end in a bearing supported in the end section 25 and indicated at 33, and suitably journaled at the opposite end in a bearing supported in the casing section 26 and indicated at 34.

Secured to the shaft 32 in conventional manner in the space within the end casing section 25 is the usual commutator 36 to the segments of which the coils (not shown) of the armature winding are connected in the usual manner. A pair of brushes 30 are associated with the commutator 36 and mounted in the end casing section 25 in the usual manner.

The wall of the rotary shaft 32 at the end within the end casing section 26 is of enlarged thickness and suitable internal threads are provided at this end for receiving an operating screw rod or member 37 in nut-and-bolt relationship.

Suitably attached to the outer face of the casing section 26 by screws not shown is an annular fitting or member 38 which has an axially projecting portion of reduced diameter provided with external threads for receiving thereon a tubular member or hollow cylinder 39 which is suitably provided at one end with corresponding internal threads. The tubular member 39 is locked to the fitting 38 in a fixed position by a plurality of screws 40 in order to prevent turning of the tubular member. The reason for securing the tubular member 39 in a fixed position will be made apparent hereinafter.

Fixed to the outer end of the tubular member 39 is an abutment, shown in the form of a screw-threaded disk 41 which is provided with a central projecting portion 42 of reduced diameter and polygonal cross-section so as to serve as a nut to enable the disk 41 to be screwed into the outer internally threaded end of the tubular member 39.

Fixed to or formed integrally with the brake operating rod 20 and the operating screw rod 37 at the adjacent ends thereof are two contacting abutments or circular disks 43 and 44, respectively, which are adapted to operate slidably, in the manner of a piston, within the circular interior bore of the tubular member 39. Each of the disks 43 and 44 is provided with one or more projecting lugs 45, two being shown, which extend into correspondingly located longitudinal grooves 46 formed on the interior surface of the wall of the tubular member 39. The operating rod 20 and the screw rod 37 are accordingly prevented from rotating.

The disk 41 fixed to the outer end of the tubular member 39 has a central bore or opening in which is suitably fixed a bushing 47 through which the operating rod 20 extends and moves in close fitting slidable relation.

The spring 12, which is illustrated as of the spiral or coil type, is interposed within the tubular member 39 between the end disk 41 and the disk 43 on the operating rod 20 and is thereby effective to exert a force urging the brake operating rod 20 in the right-hand direction as seen in Fig. 1. Movement of the operating rod 20 in the right-hand direction is effective to move the brake lever 11 and the brake rod 23 correspondingly so as to effect movement of the brake shoes toward engaging relation with the member to be braked.

It will be apparent that due to the disk 43 on the brake operating rod 20 being held against rotation undue wear at the point of pivotal connection between the rod 20 and the brake lever 11 is prevented.

Due to the disk 44 and consequently the screw rod 37 being prevented from rotating, it will be see that rotation of the armature 31 of the motor causes corresponding axial movement of the screw rod 37 in one or the other direction depending upon the direction of rotation of the armature.

The disk 44 on the end of the screw rod 37 has a smooth face which engages a corresponding smooth face on the disk 43 of the operating rod 20. Thus when the screw rod 37 is shifted axially in the left-hand direction, the spring 12 is compressed and the brake operating rod 20 shifted in the left-hand direction, this movement of the operating rod 20 correspondingly effecting movement of the brake shoes away from frictional engagement with the member to be braked. Conversely when the screw rod 37 moves axially in the right-hand direction, the spring 12 becomes effective to urge the brake operating rod 20 in the right-hand direction thus causing movement of the brake shoes into frictional engagement with the braked member.

It will be apparent that by suitably controlling the axial position of the screw rod 37, the degree of compression of the spring 12 may be varied so that the force which the spring exerts to shift the brake operating rod 20 in the right-hand or brake application direction will be correspondingly controlled and varied. The amount of axial movement of the disk 44 and the screw rod 37 in the right-hand direction is sufficient to permit the full force of the spring 12 to be effective on the brake operating rod 20 so as to effect the maximum degree of application of the brakes.

The switch device 14 comprises a slide member 61 of insulating material having a contact segment or strip 62 secured in exposed relation therein in a manner to be selectively engaged by one or the other of a pair of brushes 63 carried in spaced insulated relation in a brush support or bracket 64. The length of the contact segment 62 is slightly less than the distance between the two brushes 63 so that the two brushes may straddle the segment without being engaged thereby.

The slide member 61 is of T shape and is slidably movable in a corresponding groove or slot formed in a supporting guide member 65 that is attached in a manner not shown to a suitable support, which in the case of a railway car may be in the control cab or compartment of the car. The slide member 61 is shifted longitudinally in the guide member 65 by means of a rotary handle 66, hereinafter referred to as the brake handle. The brake handle 66 may be effective, through any suitable mechanism electrical or mechanical, to the slide member 61 in accordance with the movement of the brake handle 66. For simplicity, the brake handle is shown as having a suitable pivotal connection to the slide member 61 so that the rotary movement of the handle 66 moves the slide member 61 correspondingly.

In order to effect positive and firm contact of the brushes 63 with contact segment 62, the brush support 64 is yieldingly biased toward the slide member 61. Any suitable device may be provided for this purpose which does not interfere with the free movement of the brush support 64 in slidable relation to the exposed upper surface of the slide member 61. For illustrative purposes, a bow spring 60 of the leaf type is shown as carrying a pair of rollers 67, only one of which is shown, the spring being interposed between a fixed support 68 and the brush bracket 64 so as to yieldingly bias the rollers 67 into contact with the upper smooth surface of the brush bracket.

The brush bracket 64 is suitably guided in a manner not shown so as to maintain the necessary relationship between the brushes and the contact segments 62. The brush bracket 64 is furthermore adapted to move with and to be positioned in accordance with the movement and position of the brake operating rod 20 at all times as by a mechanical connection illustrated in the form of a Bowden wire 69. As seen in the partial section of the Bowden wire, the Bowden wire comprises an outer flexible preferably metallic sheath 70 and an inner flexible wire 71. The outer sheath 70 is fixed at one end as by a clamp 72 to the support 68 at a point adjacent the brush bracket 64 and its opposite end extends through a suitable opening in the end disk 41 of the tubular member 39 and terminates at a point closely adjacent to the disk 43 on the brake rod 20.

A set screw 73 in a projecting boss on the outer face of the end disk 41 of the tubular member 39 serves to clamp the outer sheath 70 of the Bowden wire in a fixed stationary position. One end of the internal wire 71 of the Bowden wire is fixed to the brush bracket 64 as by a clamping screw 74 and the opposite end is fixed, as by a clamping screw 75, in a projecting boss on the disk 43 of the brake operating rod 20.

It will thus be seen that when the brake operating rod 20 is shifted in the right-hand direction, the brush bracket 64 is correspondingly shifted in the left-hand direction. Conversely, when the brake operating rod is shifted in the left-hand direction the brush bracket 64 is correspondingly shifted in the right-hand direction.

The directional relays 15 and 16 are conventional relays and, being identical, the same reference numerals will be employed to designate the corresponding parts thereof. As diagrammatically shown, each of the relays 15 and 16 comprises an electromagnet or magnet winding 76 which is effective when energized to cause operation of an armature 77, indicated in the form of a plunger, from one position to which it is biased by gravity or spring means not shown to another position. The armature of each relay is effective to operate two so-called front contacts 78 and 79 respectively and one back contact 81. It will be understood that the front contacts 78 and 79 are in circuit-open position when the magnet winding 76 is deenergized and are actuated to circuit-closed position when the magnet winding is energized. The back contact 81 is in circuit-closed position when the magnet winding 76 is deenergized and is actuated to circuit-open position when the magnet winding is energized.

The electric motor 13 is operated by current supplied from any suitable source of direct-current such as a storage battery 85. As shown in Figs. 1 and 3, one terminal of the battery 85, hereinafter designated the "positive" terminal, is constantly connected electrically to the contact segment 62 on the slide member 61 of the switch device 14 by a wire or cable 86 having a flexible portion to accommodate itself to the movement of the slide member. The wire 86 may be supported at a point adjacent the slide member 61 as on an insulating block 87 secured to the guide 65.

One of the brushes 63 of the switch device 14 is connected by a wire 88 to one terminal of the magnet winding 76 of the application relay 15 and the other brush 63 is similarly connected by a wire 89 to a corresponding terminal of the magnet winding 76 of the release relay 16. The opposite terminal of the magnet winding 76 of relay 15 is connected by a wire 91 to a return wire 92 through the back contact 81 of relay 16, the return wire 92 being constantly connected to the negative terminal of the battery 85.

In a similar manner the remaining terminal of magnet winding 76 of the relay 16 is connected by a wire 93 to the return wire 92 through the back contact 81 of the application relay 15.

It will thus be seen that when the slide member 61 is shifted so as to effect engagement of the contact segment 62 with the left-hand brush 63, the circuit is completed for energizing the magnet winding of the application relay 15. In a similar manner, when the contact segment 62 engages the right-hand brush 63, a circuit is completed for energizing the magnet winding 76 of the release relay 16.

It will be apparent that the back contacts 81 of the two relays serve to interlock the energizing circuits of the two relays in such a manner as to prevent energization of both relays at the same time.

As will be hereinafter made apparent, the front contacts 78 and 79 of the application relay 15 are effective, when the relay winding is energized, to establish an energizing circuit for the motor 13 to cause rotation of the motor armature 31 in a direction to cause axial movement of the screw rod 37 in the right-hand direction, thus causing the spring 12 to be effective to exert a force on the brake rod 20 to effect application of the brakes. Conversely, the front contacts 78 and 79 of the release relay 16 are effective, when the magnet winding 76 of the relay 16 is energized, to establish a circuit for energizing the motor 13 so as to cause rotation of the armature 31 in the oppositte direction so that the screw rod 37 is correspondingly shifted in the left-hand direction to cause compression of the spring 12 and the consequent release of the brakes.

*Operation*

Assuming that the brake apparatus shown is employed in connection with the wheels of a vehicle and that the vehicle is traveling along the road under power or coasting with the brake handle 66 in its release position as shown so that the brakes are released, the operator may effect an application of the brakes to a desired degree by first shutting off the propulsion power, if the power is on, and then shift the brake handle 66 in a counterclockwise direction into the application zone an amount corresponding to the desired degree of application of the brakes.

The slide member of the switch device 14 is thus correspondingly shifted in the left-hand direction and, due to engagement of the contact segment 62 with the left-hand brush 63, the circuit for energizing the application relay 15 is completed. Relay 15 is thus actuated to establish an energizing circuit for the motor 13 which circuit extends from the positive terminal of the battery 85 through the wire 86, a wire 95, the series-connected field coils 29 of the motor, a wire 96, front contact 78 of the relay 15, a wire 97, a wire 98, brushes 30, commutator 36, and armature winding of the motor armature 31, a wire 99, a wire 101, front contact 79 of relay 15, and return wire 92 to the negative terminal of the battery 85.

The motor armature 31 is accordingly rotated in a direction to cause the screw rod 37 to be shifted axially in the right-hand direction. As the screw rod 37 moves in the right-hand direction from the position shown, the spring 12 acts to shift the brake operating rod 20 in the right-hand direction correspondingly. At the same time, through the Bowden wire 69, the brush bracket 64 is correspondingly shifted in the left-hand direction.

When the movement of the brake operating rod 20 in a right-hand direction is sufficient to cause the left-hand brush 63 to run off the left-hand end of contact segment 62, the circuit for energizing the magnet winding of the relay 15 is interrupted and consequently the relay returns to its normal position interrupting the energizing circuit of the motor which is thus promptly stopped in sufficient time to prevent the engagement of the contact segment 62 by the right-hand brush 63. If the right-hand brush 63 should engage the right-hand end of the contact segment 62, the magnet winding of the release relay 16 is energized and actuated to its position for completing the energizing circuit for the motor 13 to cause the motor armature 31 to rotate in the opposite direction until the brush 63 leaves the contact segment 62. The energizing circuit for causing reverse rotation of the motor armature will be traced hereinafter in connection with a description of the release operation of the brakes.

It will thus be seen that the motor 13 is automatically controlled to cause the screw rod 37 to be positioned in accordance with the position of the brake handle 66.

The initial movement of the brake operating rod 20 in the right-hand direction is effective to cause movement of the brake shoes from their normal release position into frictional engagement with the friction surface of the vehicle wheel. Once the brake shoes engage the friction surface of the vehicle wheel, the degree of force with which they are applied is determined by the position of the screw rod 37 which limits the force exerted by the coil spring 12 on the brake rod 20. Thus, assuming that the brake handle 66 was shifted to an intermediate position in the application zone, the spring 12 will be effective to exert only a fraction of its maximum force on the brake operating rod 20 so that the brake shoes will be applied with a corresponding force.

In order to effect a maximum or emergency application of the brakes, the operator shifts the brake handle 66 to the extremity of the application zone. In such case the motor is rotated so as to cause axial movement of the screw rod 37 sufficiently in the right-hand direction to permit the maximum force spring 12 to be exerted on the brake rod 20 thereby effecting the corresponding maximum degree of application of the brakes. When the left-hand brush 63 runs off the left-hand end of the contact segment 62 at the time the coil spring 12 effects the maximum force of application of the brakes, the disk 44 on the end of the screw rod 37 is stopped in a position out of contact with the annular fitting 38. Accordingly, jamming of the screw rod and a consequent locking of the motor armature 31 cannot occur.

Assuming that an application of the brakes has been effected in the manner just described, the operator may release the brakes in one step or he may graduate the release in a series of successive steps. In either case, the shifting of the brake handle 66 back toward release position causes the contact segment 62 on the slide member 61 to engage the right-hand brush 63 so that the energizing circuit for the release relay 16 is completed. The release relay 16 is accordingly actuated to complete the circuit for energizing the motor 13, this circuit extending from the positive terminal of the battery 85 through the wires 86 and 95, field windings 29 of the motor, wire 96, front contact 78 of the release relay 16, a wire 105, wire 99, brushes 30, commutator 36, and the armature winding of the motor, wire 98, front contact 79 of the release relay 16 and return wire 92 to the negative terminal of the battery 85.

It will be observed that with the release relay 16 energized, the direction of flow of current through the motor armature winding is opposite to that obtained when the relay 15 is energized. The reversal of the motor armature is thus accomplished according to well understood principles.

As previously stated, with the release relay 16 in its actuated position and the energizing circuit for the motor correspondingly completed, the motor armature 31 rotates in a direction to cause axial movement of the screw rod 37 in the left-hand direction. When the screw rod 37 shifts in the left-hand direction it moves the brake rod 20 correspondingly in the left-hand direction to compress the spring 12 and thus reduce the force exerted by the spring on the brake operating rod 20 so that the force of application of the brakes correspondingly diminishes.

If the operator shifts the brake handle 66 only part way back toward the normal release position, the movement of the brush bracket 64 in correspondence with the brake operating rod 20 results in the right-hand brush 63 disengaging the right-hand end of the contact segment 62 on the slide member 61 in a corresponding position so that the motor circuit is interrupted and the screw rod 37 stopped in a position corresponding to the brake handle 66.

If the operator shifts the brake handle the full amount into its normal release position shown in the drawing, the motor continues to operate and cause axial shifting of the screw rod 37 until the spring 12 is compressed a maximum amount corresponding to the normal release position of the brake shoes in clearance relation to the friction surface of the vehicle wheel. Just as in the previous case, the motor circuit is interrupted when the right-hand brush 63 runs off the right-hand end of the contact segment 62.

It will be understood that the threads on the screw rod 37 and the hollow shaft of the motor armature 31 are of such character as to be automatically self-locking when the motor armature stops rotating. In other words, the axial force exerted by the brake operating spring 12 on the screw rod 37 is ineffective to cause rotation of the motor armature 31. Thus the screw rod 37 always remains in the axial position to which it is moved at the time the motor armature stops rotating.

*Summary*

Summarizing, it will be seen that I have disclosed a brake apparatus in which the brakes are applied in varying degrees according to the force exerted by a coil spring that is controlled according to the position of a movable abutment or member. The movable abutment is fixed on a screw rod which is received in a correspondingly threaded hollow shaft of an operating motor and the screw rod is prevented from rotating so that upon rotation of the motor armature the screw rod is shifted axially in one direction or the opposite direction depending upon the direction of rotation of the motor armature. A manually operated self-lapping switch device controls the starting and stopping of the motor so as to shift the screw rod and the movable abutment to a position corresponding to the position of a brake handle for operating the switch device.

By means of the arrangement disclosed, the force of the spring effective to cause application of the brake is limited to a plurality of different degrees. Thus the brakes may be graduated on and off.

While I have illustrated my invention in simplified form, it should be readily apparent how my invention may be adapted to the control of all the brakes on a car or train. Also various other omissions, additions, and modifications may be made in the specific embodiment shown without departing from the spirit of my invention. It is accordingly not my intention to limit the scope of my invention except as it is necessitated by the scope of the prior art.

Having now described my invention, what I claim as new and desire to secure by Letters Patent is:

1. Brake apparatus comprising, in combination, a brake operating member, a spring so constructed and arranged as to exert a force urging the brake operating member in a direction to effect application of the brakes associated with a member to be braked, an electric motor of the reversible type having a rotary armature and an internally threaded hollow armature shaft, a screw member engaged in the internally threaded hollow armature shaft of the motor, means preventing rotation of said screw member so that said screw member is moved longitudinally in one direction upon rotation of the motor armature in one direction and longitudinally in the opposite direction upon rotation of the motor armature in the opposite direction, said screw member being effective according to the longitudinal position thereof to vary the degree of compression of said spring to effect the release of the brakes or the application of the brakes to a plurality of different degrees, a manually operative control member shiftable to a plurality of different positions, and means for controlling said motor to cause rotation of the rotary armature thereof in the proper direction to cause the said screw member to move toward a position corresponding to the position of said manually operative control member, and automatically stop the armature when the screw member reaches such position.

2. Brake apparatus comprising, in combination, a brake operating member, a spring so constructed and arranged as to exert a force urging the brake operating member in a direction to effect application of the brakes associated with a member to be braked, an electric motor of the reversible type having a rotary armature and an internally threaded hollow armature shaft, a screw member engaged in the internally threaded hollow armature shaft of the motor, means preventing rotation of said screw member so that said screw member is moved longitudinally in one direction upon rotation of the motor armature in one direction and longitudinally in the opposite direction upon rotation of the motor armature in the opposite direction, said screw member being effective according to the longitudinal position thereof to vary the degree of compression of said spring to effect the release of the brakes or the application of the brakes to a plurality of different degrees, a manually operative control member shiftable to a plurality of different positions, and switch means including two cooperating elements one of which is moved according to the movement of the manually operative control member and the other of which is moved in accordance with the movement of said screw member, said switch means being effective to so control the motor as to cause the rotary armature thereof to rotate in the proper direction and automatically stop in a position such that the longitudinal position of the screw member corresponds to the position of the manually operative control member.

SIDNEY G. DOWN.